(12) United States Patent
Nishikawa et al.

(10) Patent No.: US 10,954,381 B2
(45) Date of Patent: Mar. 23, 2021

(54) RESIN COMPOSITION FOR DAMPING MATERIALS

(71) Applicant: COVESTRO DEUTSCHLAND AG, Leverkusen (DE)

(72) Inventors: Shinji Nishikawa, Hyogo (JP); Shinichiro Sado, Hyogo (JP)

(73) Assignee: COVESTRO DEUTSCHLAND AG, Leverkusen (DE)

(*) Notice: Subject to any disclaimer, the term of this patent is extended or adjusted under 35 U.S.C. 154(b) by 51 days.

(21) Appl. No.: 16/333,481

(22) PCT Filed: Sep. 27, 2017

(86) PCT No.: PCT/EP2017/074524
§ 371 (c)(1),
(2) Date: Mar. 14, 2019

(87) PCT Pub. No.: WO2018/060266
PCT Pub. Date: Apr. 5, 2018

(65) Prior Publication Data
US 2019/0256708 A1  Aug. 22, 2019

(30) Foreign Application Priority Data
Sep. 30, 2016  (JP) .............................. JP2016-194849

(51) Int. Cl.
| | | |
|---|---|---|
| *C08L 75/04* | (2006.01) |
| *C08G 18/18* | (2006.01) |
| *C08G 18/22* | (2006.01) |
| *C08G 18/32* | (2006.01) |
| *C08G 18/36* | (2006.01) |
| *C08G 18/48* | (2006.01) |
| *C08G 18/76* | (2006.01) |
| *C08G 18/79* | (2006.01) |
| *C08K 5/05* | (2006.01) |
| *C08K 5/17* | (2006.01) |
| *C08G 18/66* | (2006.01) |

(52) U.S. Cl.
CPC .............. *C08L 75/04* (2013.01); *C08G 18/18* (2013.01); *C08G 18/22* (2013.01); *C08G 18/3206* (2013.01); *C08G 18/3271* (2013.01); *C08G 18/36* (2013.01); *C08G 18/4829* (2013.01); *C08G 18/6696* (2013.01); *C08G 18/7671* (2013.01); *C08G 18/797* (2013.01); *C08K 5/05* (2013.01); *C08K 5/17* (2013.01); *C08G 2350/00* (2013.01); *C08L 2312/00* (2013.01)

(58) Field of Classification Search
None
See application file for complete search history.

(56) References Cited

FOREIGN PATENT DOCUMENTS

| | | | | |
|---|---|---|---|---|
| AU | 687982 B2 * | 3/1998 | ......... C08G 18/6576 |
| EP | 3187520 A1 | 7/2017 | |
| JP | 07216049 A * | 8/1995 | |
| JP | H07216049 | 8/1995 | |
| WO | 2016031825 A1 | 3/2016 | |

OTHER PUBLICATIONS

JP-07216049A English Translation, prepared Jul. 2020. (Year: 2020).*
International Search Report for International Patent Application No. PCT/EP2017/074524, dated Nov. 28, 2017.
Written Opinion for International Patent Application No. PCT/EP2017/074524, dated Nov. 28, 2017.

* cited by examiner

*Primary Examiner* — Christopher M Rodd
(74) *Attorney, Agent, or Firm* — K&L Gates LLP

(57) ABSTRACT

The present invention is to provide a composition which can easily form a polyurethane resin which exerts particularly excellent damping properties in an operating temperature range. A resin composition for damping materials, including a polyol-containing component (A) and a polyisocyanate (B) is provided. The polyol-containing component (A) contains a castor oil. When the composition is cured, the peak on its Tan δ curve is 0.7 or more and the temperature for the peak is in a range of −10° C. to 100° C.

16 Claims, 1 Drawing Sheet

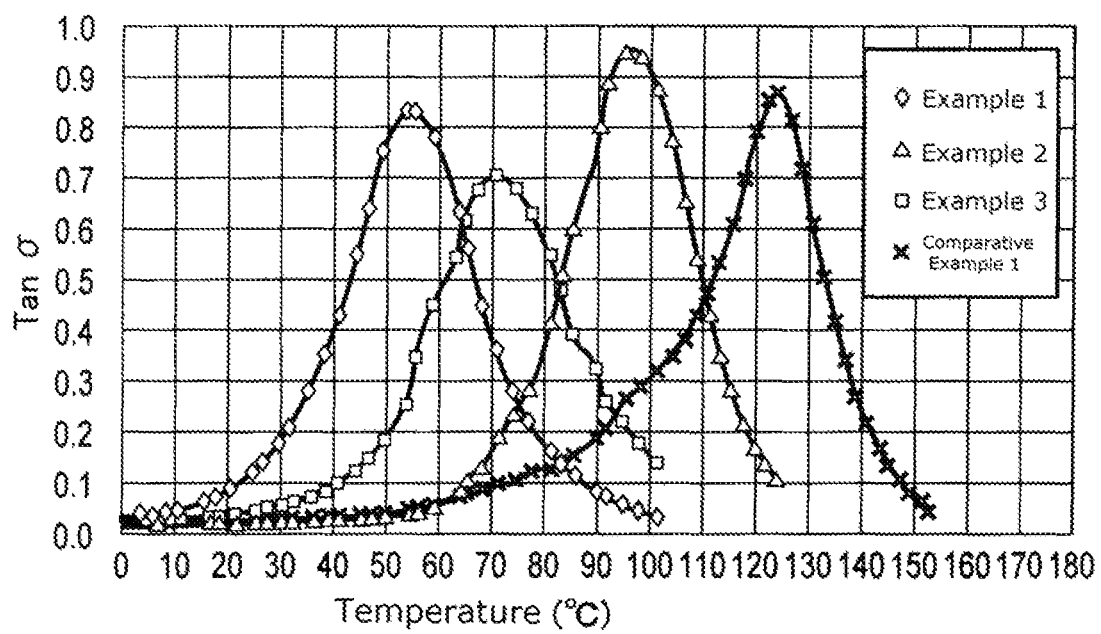

RESIN COMPOSITION FOR DAMPING MATERIALS

CROSS-REFERENCE TO RELATED APPLICATIONS

This application is a U.S. national stage application, filed under 35 U.S.C. § 371, of International Application No. PCT/EP2017/074524, which was filed on Sep. 27, 2017, and which claims priority to Japanese Patent Application No. 2016-194849, which was filed on Sep. 30, 2016. The contents of each are incorporated by reference in their entirety into this specification.

BACKGROUND OF THE INVENTION

Field of the Invention

The present invention relates to resin compositions for damping materials.

Background Art

Damping materials to be applied to the floor face of a vehicle body have been developed for the purpose of preventing the vibration of the vehicle body to prevent noise resulting therefrom, in recent years. This damping material of an application type is generally a very high viscosity item and is difficult to apply to anything other than the floor face of the body. It also necessitates a baking process in a coating drying oven after the application, posing a problem in that a large amount of energy is required in the production.

As damping materials, rubber-based materials having flexibility, urethane resin compositions having damping properties, and the like are generally used. As such a damping material, for example, Patent Document 1 describes a damping material using a polyol derived from castor oil, but its damping performance is not sufficient. In addition, Patent Document 2 describes a urethane foam material including a polyol derived from castor oil. However, there is nothing reported about the relevance between the blending amount of the polyol derived from castor oil and the tan delta (Tan δ) which is an index to damping properties and the relationship between the amount and the damping properties in an operating temperature range. Further, Patent Document 3 discloses a damping material having excellent damping characteristics, but because the material is a chlorine-containing high polymer material or an organotin-based stabilizer, its use is limited in view of environmental considerations. Under these technical circumstances, polyurethane resin materials which have excellent damping properties in an operating temperature range and are highly convenient during usage are still demanded.

PRIOR ART DOCUMENTS

Patent Documents

Patent Document 1: JP 10-251507 A
Patent Document 2: JP 2012-506464 A
Patent Document 3: JP 2002-275378 A

SUMMARY OF THE INVENTION

Technical Problem

An object of the present invention is to provide resin compositions for damping materials by utilizing a plant-derived castor oil which is a renewable material, in which the compositions have a high damping performance and exert an excellent performance especially in an operating temperature range.

Solution to Problem

According to the present invention, the following are provided:

(1) a resin composition for a damping material, including a polyol-containing component (A) and a polyisocyanate (B),
wherein the polyol-containing component (A) includes a castor oil (A1), and
wherein when the composition is cured, a peak of the Tan δ curve thereof is 0.7 or more and a temperature for the peak is in the range of −10° C. to 100° C., (2) the composition according to (1), wherein a blending amount of the castor oil (A1) in 100 parts by mass of the polyol-containing component (A) is 50 parts by mass or more, (3) the composition according to (1) or (2), wherein when the composition is cured, the temperature for the peak is in the range of 40° C. to 95° C., (4) the composition according to any one of (1) to (3), wherein the polyisocyanate (B) is at least one selected from the group consisting of an aromatic polyisocyanate, an aliphatic polyisocyanate, an alicyclic polyisocyanate, and a modified product thereof, (5) the composition according to (4), wherein the polyisocyanate (B) is a diphenylmethanediisocyanate or a urethane-modified product or carbodiimide-modified product thereof, (6) the composition according to any one of (1) to (5), wherein the polyol-containing component (A) further includes a polyol (A2) which is not derived from a castor oil and the polyol (A2) has an average functional group number of 2 to 4 and an average hydroxyl value of 400 to 600 mgKOH/g, (7) the composition according to any one of (1) to (6), wherein the polyol (A2) is a polyether polyol, (8) the composition according to any one of (1) to (7), further including a catalyst (C), (9) the composition according to (8), wherein the catalyst (C) is at least one selected from an amine catalyst or a metal catalyst,

(10) the composition according to any one of (1) to (9), further including a crosslinker (D),

(11) the composition according to (10), wherein the crosslinker (D) is a multifunctional crosslinker having two or more functional groups selected from an amino group or a hydroxyl group,

(12) the composition according to (10) or (11), wherein a blending amount of the crosslinker (D) is 1 to 15 parts by weight relative to 100 parts by mass of the polyol-containing component (A),

(13) the composition according to any one of (10) to (12), wherein the crosslinker (D) includes a non-amine crosslinker and an amine crosslinker and the non-amine crosslinker/the amine crosslinker (mass ratio) is 5 to 15,

(14) the composition according to any one of (1) to (13), for use as a coating material,

(15) the composition according to any one of (1) to (14), for use for a vehicle,

(16) a damping material obtained by curing the composition according to any one of (1) to (15).

Advantageous Effects of Invention

According to the present invention, a polyurethane resin which exerts excellent damping properties in an operating temperature range can be formed. The composition according to the present invention also allows its viscosity to be adjusted to a relatively low level and thus allows it to be applied to a site of interest in need thereof and thereby to give damping properties easily. In addition, the composition according to the present invention has a relatively low curing temperature and can be cured at room temperature, hence allowing energy usage to be significantly reduced in the production of damping materials. Further, the composition according to the present invention uses, as a raw material, a castor oil which is a renewable material derived from nature, resulting in having fewer environmental restrictions and being advantageous in industrial production.

BRIEF DESCRIPTION OF THE DRAWING

The FIGURE shows the results obtained by measuring the molded articles of Example 1, Example 2, Example 3, and Comparative Example 1 for viscoelasticity at a frequency of 10 Hz in the temperature range of −20° C. to 150° C. and measuring the temperatures for the peaks and the tan delta (Tan δ) values at the peaks.

DETAILED DESCRIPTION OF THE INVENTION

The resin composition for a damping material according to the present invention includes a polyol-containing component (A) and a polyisocyanate (B), in which the polyol-containing component (A) includes a castor oil (A1) and the blending amount of the castor oil is 50 parts by mass or more in 100 parts by weight of the polyol-containing component (A). Further, the composition according to the present invention is characterized in that when it is cured, a peak of its Tan δ curve is 0.7 or more and the temperature for the peak is in the range of −10° C. to 100° C. It is a surprising fact that compositions having such characteristics as the present invention exert remarkable damping properties in an operating temperature range. Such damping properties can be determined by the approach described in the below-mentioned Examples, with a peak of the Tan δ curve as an index. Each component constituting the composition according to the present invention will be described below.

(Polyol-Containing Component (A))

The polyol-containing component (A) constituting the composition according to the present invention includes at least a castor oil, as described above.

The upper limit of the blending amount of the polyol-containing component (A) in the composition according to the present invention is preferably 70 parts by mass, more preferably 60 parts by mass, still more preferably 55 parts by mass, relative to 100 parts by mass of the total composition, but is not particularly limited thereto as long as it does not inhibit the effects of the present invention. Then, the lower limit of the blending amount of the polyol-containing component (A) in the composition according to the present invention is preferably 10 parts by mass, more preferably 20 parts by mass, still more preferably 30 parts by mass, still more preferably 35 parts by mass, relative to 100 parts by mass of the total composition. The range of the blending amount of the polyol-containing component (A) in the composition according to the present invention may also be selected as appropriate from combinations of the upper limit and the lower limit, and is preferably 10 to 70 parts by mass, more preferably 20 to 60 parts by mass, still more preferably 30 to 55 parts by mass, still more preferably 35 to 55 parts by mass, relative to 100 parts by mass of the total composition.

(Castor Oil (A1))

The castor oil (A1) according to the present invention is preferably a non-modified castor oil. Here, a non-modified castor oil refers to a castor oil which has not undergone any treatment process other than purification. In castor oil, a main component is a triglyceride containing 12-hydroxyoctadeca-9-enonic acid (ricinoleic acid) as a fatty acid component. Thus, according to a preferred aspect of the present invention, the castor oil is a fat containing a triglyceride of 12-hydroxyoctadeca-9-enonic acid (ricinoleic acid).

The castor oil according to the present invention has an average functional group number of preferably 2.0 to 2.7 and an average hydroxyl value of 30 to 170 mgKOH/g, more preferably an average functional group number of 2.2 to 2.7 and an average hydroxyl value of 100 to 160 mgKOH/g. Here, an average functional group number refers to the number of functional groups per molecule, and can be controlled by the functional group number of an initiator. Next, a hydroxyl value as described above is a value in mg of potassium hydroxide required to acetylate hydroxyl groups contained in 1 g of a sample (solid content). Thus, it is determined according to the following equation after hydroxyl groups in the sample are acetylated using acetic anhydride and the unused acetic acid is titrated with a potassium hydroxide solution.

hydroxyl value [mgKOH/g]=[((A−B)×f×28.05)/S]+ acid value

A: the amount (ml) of 0.5 mol/l potassium hydroxide ethanol solution used in a blank test B: the amount (ml) of 0.5 mol/l potassium hydroxide ethanol solution used in titration f: factor S: the amount (g) of a sample taken In the polyol-containing component (A) according to the present invention, the blending amount of the castor oil is preferably at a high level. More specifically, the blending amount of the castor oil (A1) is preferably 50 parts by mass or more, more preferably 60 parts by mass or more, still more preferably 100 parts by mass, relative to 100 parts by mass of the polyol-containing component (A).

(Polyol (A2))

The polyol-containing component (A) according to the present invention may further include a polyol (A2) which is not derived from castor oil.

The blending amount of the polyol (A2) according to the present invention is preferably less than 50 parts by mass, more preferably less than 40 parts by mass, still more preferably 1 part by mass or less, still more preferably 0 parts by mass, relative to 100 parts by mass of the polyol-containing component (A). According to one aspect of the present invention, the range of the preferable blending amount of the polyol (A2) is 1 to 40 parts by mass relative to 100 parts by mass of the polyol-containing component (A).

The average functional group number of the polyol (A2) according to the present invention is preferably 2 to 4, more preferably 2.5 to 3.5.

Then, the average hydroxyl value of the polyol (A2) according to the present invention is preferably 300 to 700 mgKOH/g, more preferably 400 to 600 mgKOH/g.

Examples of polyols (A2) include polyether polyol, polyester polyol, polycarbonate polyol, caprolactone polyol, and the like, preferably polyether polyol.

The polyether polyol in the present invention is preferably one which is obtained by reacting one or more starting compounds having a reactive hydrogen atom with an alkylene oxide (for example, ethylene oxide, propylene oxide, butylene oxide, styrene oxide, tetrahydrofuran, epichlorohydrin, or a mixture thereof) by a known method. An example of an alkylene oxide is preferably ethylene oxide or propylene oxide, more preferably propylene oxide. Examples of preferable starting compounds having a reactive hydrogen atom preferably include polyhydric alcohol (for example, ethylene glycol, 1,2- and 1,3-propylene glycol, 1,3- and 1,4-butylene glycol, 1,6-hexane diol, 1,8-octanediol, neopentyl glycol, cyclohexane dimethanol, (1,4-bis(hydroxymethyl)cyclohexane), 2-methyl-1,3-propanediol, 2,2,4-trimethyl-1,3-pentanediol, triethylene glycol; tetraethylene glycol, polyethylene glycol, dipropylene glycol; polypropylene glycol, dibutylene glycol, polybutylene glycol, glycerin, trimethylolpropane, and the like), more preferably glycerin. The polyether polyol according to the present invention is particularly preferably a propoxylated triol including glycerin and propylene oxide as constituent units.

(Polyisocyanate (B))

As the polyisocyanate (B) constituting the composition according to the present invention, one which is commonly used for the production of polyurethane resins is used. Examples of such polyisocyanates (B) include aromatic polyisocyanate, aliphatic polyisocyanate, alicyclic polyisocyanate, a modified substance thereof (for example, a modified substance containing a urethane group, carbodiimide group, allophanate group, urea group, biuret group, isocyanurate group, or oxazolidone group, and the like), and a mixture of two or more species thereof.

Examples of aromatic polyisocyanates include 1,3- and/or 1,4-phenylene diisocyanate, 2,4- and/or 2,6-tolylene diisocyanate (TDI), polymeric TDI (also referred to as rough TDI or crude TDI), 2,4'- and/or 4,4'-diphenylmethanediisocyanate (MDI), polymethylenepolyphenyl isocyanate (also referred to as rough MDI or crude MDI), polyaryl polyisocyanate (PAPI), and the like.

Examples of aliphatic polyisocyanates include aliphatic diisocyanates having 2 to 18 carbon atoms, and the like. Specific examples thereof include 1,6-hexamethylene diisocyanate, lysine diisocyanate, and the like.

Examples of alicyclic polyisocyanates include alicyclic diisocyanates having 4 to 16 carbon atoms, and the like. Specific examples thereof include isophorone diisocyanate (IPDI), 4,4'-dicyclohexylmethane diisocyanate, norbornane diisocyanate, and the like.

According to a preferred aspect of the present invention, the polyisocyanate (B) preferably includes diphenylmethanediisocyanate or a modified product thereof. In addition, the diphenylmethanediisocyanate is preferably 2,4'- and/or 4,4'-diphenylmethanediisocyanate. Illustrative examples of modified products of diphenylmethanediisocyanate can include, for example, modified products which can be obtained by urea-forming, biuret-forming, allophanate-forming, carbodiimide-forming, isocyanurate-forming, urethane-forming, and/or the like, preferably a urethane-modified product or carbodiimide-modified product of diphenylmethanediisocyanate, more preferably a carbodiimide-modified product (carbodiimide-modified diphenylmethanediisocyanate).

The blending amount of the polyisocyanate (B) according to the present invention is preferably 60 parts by mass to 200 parts by mass, more preferably 70 parts by mass to 190 parts by mass, still more preferably 80 parts by mass to 180 parts by mass, relative to 100 parts by mass of the polyol-containing component (A).

(Catalyst (C))

The composition according to the present invention preferably has a catalyst (C) further blended in addition to the polyether (A) and the polyisocyanate (B). The blending of such a catalyst (C) into the composition is advantageous in that a polyurethane resin having damping properties is efficiently produced directly in a desired location to which the composition has been applied.

The blending amount of the catalyst (C) according to the present invention is, for example, preferably 0.12 to 4.5 parts by mass, more preferably 0.12 to 3.5 parts by mass, still more preferably 0.2 to 3.5 parts by mass, relative to 100 parts by mass of the polyol-containing component (A) according to the present invention, but is not particularly limited thereto as long as it does not inhibit the effects of the present invention.

The catalyst according to the present invention is preferably an amine catalyst, a metal catalyst, or a mixture thereof. Examples of amine catalysts can include any one or more types of compounds which include an amino group and exhibit the aforementioned catalytic activity. Such amine catalysts may be essentially linear, branched, or cyclic non-aromatic or aromatic ones. The amine catalysts may also be the primary amine, secondary amine, or tertiary amine, and is preferably the tertiary amine. More specifically, examples of amine catalysts include aliphatic amine, cyclic amine, ether diamine, hydroxyl-group-containing amine, and the like.

Preferred examples of aliphatic amines include monovalent aliphatic amine (N,N-dimethylcyclohexylamine, N,N-dicyclohexylmethylamine, N,N-dimethylcetylamine, triethylamine, N,N-dimethyldodecylamine, and the like), bivalent aliphatic amine (N,N,N',N'-tetramethylethylenediamine, N,N,N',N'-tetramethyl-1,3-propanediamine, N,N,N',N'-tetramethylhexanediamine, methylenebis(dimethylcyclohexylamine), 3-dimethylamino-N,N-dimethylpropionamide, N,N,N',N'-tetraethylmethylenediamine, and the like), and trivalent to octavalent or more multivalent aliphatic amine (N,N,N',N',N''-pentamethyldiethylenetriamine, N,N,N,N', N'''-pentamethyldipropylenediamine, N,N,N',N'-tetra(3-dimethylaminopropyl)methanediamine, and the like).

Examples of cyclic amines include monovalent cyclic amine (N-methyl morpholine, N-ethyl morpholine, and the like), bivalent or more multivalent cyclic amine (triethylenediamine, N,N'-dimethylpiperazine, N,N'-diethylpiperazine, N-methyl-N'-dimethylaminoethoxypiperazine, N-(2-dimethylaminoethoxy)morpholine, 1,2-dimethylimidazole, 1,2-dimethylimidazole (DABCO™ 2040), and 1,8-diazabicyclo[5,4,0]undecene-7), and the like, preferably 1,2-dimethylimidazole.

Examples of ether diamines include bis-2-dimethylaminoethylether, 2-(N,N-dimethylamino)ethyl-3-(N,N-dimethylamino)propylether, 4,4'-oxydiethylenedimorpholine, ethylene glycol bis(3-dimethylaminopropyl)ether, and the like.

Examples of hydroxyl-group-containing amines include N,N-dimethylaminoethanol, EO adduct of N,N-dimethylaminoethanol, N,N-tetramethyl-1,3-diamino-2-propanol, N,N,N'-trimethylaminoethylethanolamine, N,N,N'-trimethylaminopropylethanolamine, N-methyl-N'-(2-hydroxyethyl)piperazine, N-(2-hydroxyethyl)morpholine, 1-(2-hydroxypropyl)imidazole, 2,4,6-tris(dimethylaminoethyl)-phenol, 1,4-bis(2-hydroxypropyl)-2-ethylpiperazine, and the like.

The blending amount of the amine catalyst is, for example, 0.1 to 3.0 parts by mass, preferably 0.1 to 2.0 parts by mass, more preferably 0.1 to 1.0 parts by mass, relative to 100 parts by mass of the polyol-containing component (A) according to the present invention, but is not particularly limited thereto as long as it does not inhibit the effects of the present invention.

Examples of useful metals used as the metal catalysts according to the present invention include tin, antimony, lead, bismuth, cobalt, iron, and the like in view of facilitating urethane-forming and urea-forming reactions, and more preferably include tin. The metal catalyst may also be either of an inorganic metal catalyst or an organic metal catalyst as long as it exhibits the catalytic activity according to the present invention, and is preferably an organic metal catalyst. Preferred examples of organic metal catalysts include alkyl-substituted organotin catalysts (tin octoate, dibutyltin dilaurate, dimethyltin dilaurate, dimethyltin dimercaptide, and the like), lead octoate, lead naphthenate, bismuth octoate, bismuth neodecanoate, cobalt naphthenate, cobalt octoate, acetylacetonate iron, and the like, more preferably dimethyltin dimercaptide.

The blending amount of the metal catalyst is, for example, preferably 0.01 to 1.5 parts by mass, more preferably 0.02 to 1.0 parts by mass, still more preferably 0.03 to 0.5 parts by mass, relative to 100 parts by mass of the polyol-containing component (A) according to the present invention, but is not particularly limited thereto as long as it does not inhibit the effects of the present invention.

When both a metal catalyst and an amine catalyst are used together for the catalyst (C) according to the present invention, the blending ratio (converted in mass) of the metal catalyst to the amine catalyst, as amine catalyst/metal catalyst, can be, for example, 1 to 10, preferably 2 to 8, more preferably 3 to 7.5, still more preferably 3.5 to 7.5, but is not particularly limited thereto as long as it does not inhibit the effects of the present invention.

(Crosslinker (D))

The composition according to the present invention may include a crosslinker (D) in view of giving favorable properties to polyurethane resins having damping properties. The blending amount of the crosslinker (D) is, for example, 0 to 20 parts by mass, preferably 0 to 15 parts by mass, more preferably 0.1 to 15 parts by mass, still more preferably 1 to 15 parts by mass, for example, relative to 100 parts by mass of the polyol-containing component (A) according to the present invention, but is not particularly limited thereto as long as it does not inhibit the effects of the present invention.

The crosslinker (D) according to the present invention is preferably a multifunctional crosslinker having two or more functional groups selected from an amino group and a hydroxyl group, more preferably a non-amine crosslinker having no amino group, an amine crosslinker having an amino group, or a combination thereof, but is not particularly limited thereto as long as it does not inhibit the effects of the present invention.

Examples of non-amine crosslinkers include a polyhydric alcohol having no amino group, preferably a polyhydric alcohol (low molecular weight polyol) having a molecular weight of 62 to 300, and specific examples thereof include ethylene glycol, propylene glycol, butanediol, hexane diol, neopentyl glycol, diethylene glycol, triethylene glycol, polyethylene glycol, dipropylene glycol, polypropylene glycol, ethylene oxide (EO) or propylene oxide (PO) adduct thereof, or a combination thereof, preferably ethylene glycol.

The blending amount of the non-amine crosslinker is, for example, 0 to 20 parts by mass, preferably 0 to 14 parts by mass, more preferably 0.1 to 14 parts by mass, still more preferably 5 to 14 parts by mass, relative to 100 parts by mass of the polyol-containing component (A) according to the present invention, but is not particularly limited thereto as long as it does not inhibit the effects of the present invention.

Examples of amine crosslinkers include alkanolamine (monoethanolamine, triethanolamine, diethanolamine, and the like), bivalent amine (2,4- and 2,6-diaminotoluene including a mixture of 80/20 parts by mass), 4,4'- and 4,4'-diaminodiphenylmethane, polyphenylpolymethylenepolyamine obtained by aniline formaldehyde condensation, diethyltoluenediamine, t-butyltoluenediamine, diethyldiaminobenzene, triethyldiaminobenzene, tetraethyldiaminodiphenylmethane), EO or PO adduct thereof, or a combination thereof, and the like, preferably alkanolamine, more preferably monoethanolamine.

Examples of preferable combinations of crosslinkers according to the present invention include a combination of ethylene glycol and alkanolamine, more preferably a combination of ethylene glycol and monoethanolamine.

The blending amount of the amine crosslinker is, for example, 0 to 4 parts by mass, preferably 0 to 3 parts by mass, more preferably 0.1 to 2.5 parts by mass, still more preferably 1 to 2 parts by mass, relative to 100 parts by mass of the polyol-containing component (A) according to the present invention, but is not particularly limited thereto as long as it does not inhibit the effects of the present invention.

When both a non-amine crosslinker and an amine crosslinker are used together for the crosslinker (D) according to the present invention, the blending ratio (converted in mass) of the non-amine crosslinker to the amine crosslinker, as non-amine crosslinker/amine crosslinker, can be, for example, 1 to 20, preferably 2 to 15, more preferably 3 to 15, still more preferably 5 to 15, but is not particularly limited thereto as long as it does not inhibit the effects of the present invention.

(Other Components (E))

To the composition according to the present invention, additives known in the art, including a coloring agent, flame retardant, antioxidant, ultraviolet absorber, conductivity imparting agent, reinforcing material, filler, and the like, may be further added as other components (E), if desired, in addition to the aforementioned (A) to (D), taking applications and application locations into account. Examples of fillers include inorganic fillers such as calcium carbonate, barium sulfate, talc, clay, silica, and silicate calcium.

The blending amount of the other components (E) can be, but is not particularly limited to, for example, 200 parts by mass or less, for example, 0.1 to 50 parts by mass, relative to 100 parts by mass of the polyol-containing component (A).

(Method for Producing)

The composition for forming a polyurethane resin having damping properties according to the present invention can easily be produced by mixing the aforementioned (A) to (E) in accordance with a known method. The mixing of the (A) to (E) is not limited to a particular order, but preferably includes mixing the polyol-containing component (A), the catalyst (C), and the crosslinker (D) to obtain a polyol mixture (hereinafter also referred to as "polyol mixture (X)") and then mixing the polyol mixture (X) and the polyisocyanate (B), in view of the efficient production of polyurethane resins having damping properties. The addition (E) can be added to the polyol mixture (X) (mixture of (A), (C), and (D)), the polyisocyanate (B), or a mixture of (A) to (D), but the mixing is not particularly limited to this order as long as it does not inhibit the effects of the present invention.

In the production of the composition according to the present invention, an isocyanate index of the polyisocyanate (B) to the polyol mixture (X) (mixture of (A), (C), and (D)) [(ratio of the equivalent of isocyanate groups in the polyisocyanate to the equivalent of active hydrogen in the polyol mixture)×100)] is preferably 70 to 130, more preferably 90 to 110.

According to the present invention, allowing the composition to experience a curing reaction can make it a polyurethane resin having excellent damping properties.

The curing of the composition according to the present invention can be carried out by casting the composition into a mold (molding tool) using a commonly used reaction injection molding (RIM: Reaction Injection Molding) machine or the like. For the composition according to the present invention in this case, the polyol mixture (X) and the polyisocyanate (B) may be mixed in a molding tool or both of them may be mixed to form one composition before being cast into a molding tool. As a reaction injection molding machine, for example, A-System High-Pressure Injection Molding Machine available from Canon Inc. can be used.

A temperature at which the composition, the polyol mixture (X), or the polyisocyanate (B) according to the present invention is cast into a mold in the reaction injection molding machine is preferably 20° C. to 40° C. but is not particularly limited thereto as long as it does not inhibit the production of polyurethane resins having damping properties. A mold temperature at which the reaction injection molding is carried out is preferably 50° C. to 80° C.

The composition according to the present invention may be heated to be cured using a reaction injection molding machine in view of rapid curing but may be allowed to stand at room temperature to be cured, and the present invention encompasses such an aspect.

In the production and curing of the composition according to the present invention, no foaming agent is used in principle. Examples of such foaming agents include water, halogenated hydrocarbons, carbon dioxide gas, nitrogen, and the like. However, mixing gas into the raw material may be done as a general technique for obtaining a high density molded article in reaction injection molding, and the present invention encompasses such an aspect. Examples of such approaches for producing high density molded articles using gas include a technique in which nitrogen, air, or carbon dioxide gas is dissolved or dispersed into the raw material, the cast reaction liquid mixture is allowed to rapidly foam, and filling the space remaining after the raw material is cast allows mechanical variations in the cast raw material to be absorbed; and a technique in which gas is used in order to have a function of preventing the molded article from contracting during curing and from causing defective molding.

(Cured Composition/Applications)

Curing the composition according to the present invention into a polyurethane resin can make it an excellent damping material. Thus, according to another aspect of the present invention, a damping material obtained by curing the composition according to the present invention is provided.

For the cured composition according to the present invention, the lower limit of the peak of the Tan δ curve is 0.7, preferably 0.8, more preferably 0.82, still more preferably 0.85, in view of giving sufficient damping properties to an object to which it is applied. In addition, the preferred range of the peak of the Tan δ curve can be regulated to, for example, 0.7 to 1.5, preferably 0.8 to 1.2.

In addition, the cured composition according to the present invention preferably has the peak at a temperature which is in an operating temperature range, in view of handling convenience. Such a temperature range for the peak is in the range of −10° C. to 100° C., more preferably 0° C. to 100° C., still more preferably 40° C. to 95° C.

In addition, the cured composition according to the present invention can be regulated so as to have properties depending on the application by regulating the blending amount, reaction temperature, and the like. For example, a density of the cured composition according to the present invention (as a density of only the resin excluding the other components (E)) is preferably 0.9 g/cm$^3$ to 1.3 g/cm$^3$, more preferably 0.95 g/cm$^3$ to 1.2 g/cm$^3$, as measured in accordance with JIS K7222(1999-based).

A hardness of the cured composition according to the present invention is preferably 90 to 110, more preferably 95 to 100, as converted to Asker hardness (A). The hardness as converted to Asker hardness (D) is preferably 50 to 80, more preferably 55 to 75. Asker hardness (A/D) can be measured by the method in accordance with JIS K6253-3 using a Type A/D durometer in accordance with JIS K6253.

Because the composition according to the present invention has some viscosity before being cured and has the ability to get cured at a relatively low temperature, the composition can be applied to a desired object of application and be cured, thereby giving damping properties easily. Thus, according to another aspect of the present invention, a coating material including the composition according to the present invention is provided. In addition, according to another aspect of the present invention, uses of the composition as a coating material are provided.

The composition according to the present invention can be applied using a variety of known methods. Specific examples of applying methods include, for example, general-purpose air spraying, airless spraying, brush coating, roller brush coating, roll coating, curtain flow coating, immerse coating, and the like. A method using a two-pack high-pressure or low-pressure spraying device can also be included. Examples of two-pack high-pressure spraying devices include Model H-2000 (with a two-pack collisional mixing type nozzle) available from Gusmer Corporation, U.S.A., and UNIPREG 41-2D (with a static mixing type nozzle) available from Unipre GmbH. In addition, a stirring mixer with a fish-tail type attachment at its tip can allow the composition to be applied in a linear shape, not in a dotted shape.

The composition according to the present invention is easy to handle, as described above, and thus can also be applied to various locations and products to which damping properties need to be given. Preferred examples include floor faces, side faces (automobile exterior parts such as bumpers, fascias, side moldings, quarter panels, door panels, and the like), or ceiling faces of vehicles. In addition to the aforementioned objects of application, furniture articles, housings of electrical appliances, or those belts, rolls, sheets, and the like for which thermosetting polyurethane resins are generally used are applicable possibilities.

EXAMPLES

Below, Examples will be shown and the present invention will be described more specifically. These Examples are not intended to limit the contents of the present invention in any way. Unless otherwise specified, units and measurement methods in the present invention are based on the definition by the Japanese Industrial Standard (JIS). "Parts" and "%" mean "parts by mass" and "% by mass" respectively.

Example 1

As a polyol-containing component (A), a castor oil (polyol (A1)) (industrial number 1 castor oil available from Hokoku Co., Ltd.: polyester polyol having an average functional group number of about 2.7 and an average hydroxyl value of about 160 mgKOH/g) was made ready for use. Then, 6.67 parts of ethylene glycol and 1.11 parts of monoethanolamine as crosslinkers, 0.22 parts of Dabco 2040 (1,2-dimethylimidazole available from Air Products and Chemicals Inc.) as an amine catalyst, and 0.06 parts of UL-22 (dimethyltindimercaptide available from Momentive Performance Materials Inc.) as a tin catalyst, relative to 100 parts of the polyol-containing component (A), were added and uniformly mixed to obtain a polyol mixture (X).

Then, a polyisocyanate (B) (liquid carbodiimide-modified diphenylmethanediisocyanate (NCO %=29%) available from Sumika Covestro Urethane Co., Ltd.) was made ready for use.

Then, the polyol mixture (X) and the (B) were mixed to have an isocyanate index of 105, using a high-pressure foaming machine available from Canon Inc., and cast into a mold to obtain a molded article of the polyurethane resin of Example 1 (in the form of a sheet with a thickness of about 2 mm) The molding conditions were as shown in Table 1. In this case, the percentage content of castor oil contained in the resin composition was 53% by weight.

Example 2

Example 2 was obtained in the same manner as in Example 1 except that 50% of the polyol (A1) in the formulation of Example 1 was replaced with polyether polyol (polyol A2) (propoxylated triol including glycerin and propylene oxide as constituent units, having a functionality of about 3 and a OH value of about 445 to 495, available from Sumika Covestro Urethane Co., Ltd.) and the amount of the metal catalyst was changed to 0.03 parts by weight.

Example 3

Example 3 was obtained in the same manner as in Example 1 except that the amount of the ethylene glycol in the formulation of Example 1 was replaced with 13.33 parts by weight.

Comparative Example 1

Comparative Example 1 was obtained in the same manner as in Example 2 except that the total amount of the polyol A2 in the formulation of Example 1 was replaced with polyether polyol (polyol A2) (propoxylated triol including glycerin and propylene oxide as constituent units, having a functionality of about 3 and a OH value of about 445 to 495, available from Sumika Covestro Urethane Co., Ltd.), the amount of the monoethanolamine was changed to 0 parts, and that of ethylene glycol was changed to 7.78 parts.

Properties Measurement Test

Example 1, Example 2, Example 3, and Comparative Example 1 were measured for initial properties by the following method.

Density: measured in accordance with JIS K7222(1999-based)

Asker hardness: measured using a Type A/D durometer in accordance with JIS K6253 by the method in accordance with JIS K6253-3.

Damping Properties

Viscoelasticity was measured using the Rheogel-E4000 available from UBM Co., Ltd. at a frequency of 10 Hz at a temperature-increasing rate of 5° C./min. in the temperature range of −20° C. to 150° C., and the temperatures for the peaks and the tan delta (Tan δ) values at the peaks were measured.

As a result, the temperature range in which the Tan δ values of Examples 1 to 3 were at their peak at 0.7 or more was from −10° C. to 100° C., as shown in Table 1 and the FIGURE, confirming particularly excellent damping properties in an operating temperature range.

On the contrary, the temperature at which the Tan δ value of Comparative Example 1 was at its peak at 0.7 or more was 124° C., which was significantly above 100° C.

TABLE 1

|  |  |  | Unit | Example 1 | Example 2 | Example 3 | Comparative Example 4 |
|---|---|---|---|---|---|---|---|
| Polyol mixture (X) | Polyol-containing component (A) | Castor oil (A1) | parts | 100 | 50 | 100 |  |
|  |  | Polyether polyol (A2) | parts |  | 50 |  | 100 |
|  | Catalyst (C) | Amine catalyst | parts | 0.22 | 0.22 | 0.22 | 0.22 |
|  |  | Metal catalyst | parts | 0.06 | 0.03 | 0.06 | 0.03 |
|  | Crosslinker (D) | Monoethanolamine | parts | 1.11 | 1.11 | 1.11 |  |
|  |  | Ethylene glycol | parts | 6.67 | 6.67 | 13.33 | 7.78 |
|  | Isocyanate (B) | Carbodiimide-modified MDI | parts | 82 | 124 | 114 | 166 |
|  |  | Isocyanate index |  | 105 | 105 | 105 | 105 |
| (Reactivity) | Raw material temperature (Polyol/isocyanate) |  | ° C. | 30/30 | 30/30 | 30/30 | 30/30 |
|  | Gel time* |  | sec | 18 | 20 | 13 | 23 |
|  | Tack-free time** |  | sec | 30 | 23 | 21 | 28 |
| (Properties) | Thickness |  | mm | 2.0 | 2.0 | 2.0 | 2.0 |
|  | Density |  | g/cm³ | 0.97 | 0.98 | 0.97 | 0.96 |
|  | Asker hardness (A/D) |  |  | 98/60 | 99/72 | 99/75 | 99/67 |
|  | Temperature for peak |  | ° C. | 56 | 92 | 72 | 124 |
|  | Tan δ of peak |  |  | 0.83 | 0.95 | 0.70 | 0.87 |

*"Gel time" means the time (in seconds) required until a mixture obtained when the polyol-containing component (A) and the isocyanate (B) have been mixed becomes a liquid such that any part thereof is drawn in threads when touched with a rod-shaped solid.
**"Tack-free time" means the time (in seconds) required until a mixture obtained when the polyol-containing component (A) and the isocyanate (B) have been mixed becomes a liquid such that no part of its surface sticks to a finger when touched.

The results in Table 1 and the FIGURE confirmed that an increased ratio of the castor oil allows the temperature for the peak to be 100° C. or less without decreasing the Tan δ value. In other words, Examples 1 to 3 in which the ratio of the castor oil was increased were confirmed to be damping materials having a high damping performance in an operating temperature range.

INDUSTRIAL APPLICABILITY

According to the present invention, a resin composition for damping materials which exerts an excellent damping performance in an operating temperature range can be provided. Because the composition according to the present invention has convenience of handling, it can be advantageously used for a wide range of objects of application which need to be provided with damping properties, including vehicles.

What is claimed is:

1. A resin composition for a damping material, comprising a polyol-containing component (A) and a polyisocyanate (B),
    wherein the polyol-containing component (A) comprises a castor oil (A1), and further comprises a polyol (A2) which is not derived from castor oil, the polyol (A2) being selected from polyether polyols, polyester polyols, polycarbonate polyols and caprolactone polyols,
    wherein the polyether polyols have an average hydroxyl value of 300 to 700 mgKOH/g,
    wherein the isocyanate index of the resin composition ranges from 70 to 110, and wherein when the composition is cured, a peak of the tan δ curve thereof is 0.7 or more and a temperature for the peak is in the range of −10° C. to 100° C.

2. The composition according to claim 1, wherein a blending amount of the castor oil (A1) in 100 parts by mass of the polyol-containing component (A) is 50 parts by mass or more.

3. The composition according to claim 1, wherein when the composition is cured, the temperature for the peak is in the range of 40° C. to 95° C.

4. The composition according to claim 1, wherein the polyisocyanate (B) is at least one selected from the group consisting of an aromatic polyisocyanate, an aliphatic polyisocyanate, an alicyclic polyisocyanate, and a modified product thereof.

5. The composition according to claim 1, wherein the polyisocyanate (B) is a diphenylmethanediisocyanate or a urethane-modified product or carbodiimide-modified product thereof.

6. The composition according to claim 1, wherein the polyol-containing component (A) the polyol (A2) has an average functional group number of 2 to 4 and an average hydroxyl value of 400 to 600 mgKOH/g.

7. The composition according to claim 6, wherein the polyol (A2) is a polyether polyol.

8. The composition according to claim 1, further comprising a catalyst (C).

9. The composition according to claim 8, wherein the catalyst (C) is at least one selected from an amine catalyst or a metal catalyst.

10. The composition according to claim 1, further comprising a crosslinker (D).

11. The composition according to claim 10, wherein the crosslinker (D) is a multifunctional crosslinker comprising two or more functional groups selected from an amino group or a hydroxyl group.

12. The composition according to claim 10, wherein a blending amount of the crosslinker (D) is 1 to 15 parts by weight relative to 100 parts by mass of the polyol-containing component (A).

13. The composition according to claim 10, wherein the crosslinker (D) comprises a non-amine crosslinker and an amine crosslinker and the non-amine crosslinker/the amine crosslinker (mass ratio) is 5 to 15.

14. A coating material comprising the composition according to claim 1.

15. A vehicle comprising the composition according to claim 1.

16. A damping material obtained by curing the composition according to claim 1.

* * * * *